United States Patent
Guering

(10) Patent No.: US 10,005,537 B2
(45) Date of Patent: Jun. 26, 2018

(54) AIRCRAFT FUSELAGE AND METHOD FOR CONSTRUCTING A FLOOR IN SUCH A FUSELAGE

(71) Applicant: Airbus Operations (S.A.S.), Montrabe (FR)

(72) Inventor: Bernard Guering, Montrabe (FR)

(73) Assignee: Airbus Operations (S.A.S.), Toulouse (FR)

( * ) Notice: Subject to any disclaimer, the term of this patent is extended or adjusted under 35 U.S.C. 154(b) by 350 days.

(21) Appl. No.: 14/062,069

(22) Filed: Oct. 24, 2013

(65) Prior Publication Data

US 2014/0110529 A1 Apr. 24, 2014

Related U.S. Application Data

(63) Continuation of application No. PCT/FR2012/050840, filed on Apr. 17, 2012.

(30) Foreign Application Priority Data

Apr. 26, 2011 (FR) ...................................... 11 01290

(51) Int. Cl.
*B64C 1/06* (2006.01)
*B64C 1/18* (2006.01)

(52) U.S. Cl.
CPC ................ *B64C 1/061* (2013.01); *B64C 1/18* (2013.01); *Y10T 29/49622* (2015.01)

(58) Field of Classification Search
CPC .................................. B64C 1/18; B64C 1/061
See application file for complete search history.

(56) References Cited

U.S. PATENT DOCUMENTS 6,554,225 B1 * 4/2003 Anast .................. B64C 1/18
 105/422
8,240,606 B2 * 8/2012 Westre .................. B64C 1/18
 244/119

(Continued)

FOREIGN PATENT DOCUMENTS

FR 2 900 125 4/2006
FR 2 947 525 1/2011

(Continued)

OTHER PUBLICATIONS

French Search Report for Application No. FR 750128 dated Dec. 13, 2011.

(Continued)

*Primary Examiner* — Katherine W Mitchell
*Assistant Examiner* — Catherine A Kelly
(74) *Attorney, Agent, or Firm* — Jenkins, Wilson, Taylor & Hunt, P.A.

(57) ABSTRACT

Such a fuselage includes cross-members adapted for the formation of a floor, at least one of said cross-members including an upper part, a lower part, linkage for the lower part to the upper part, and at least one opening for the passage of systems which is delimited between the lower part and the upper part. The upper part of the cross-member is fastened to the fuselage and is dimensioned so as to bear the stresses to which said cross-member may be subjected when the aircraft remains on the ground. The lower part is fastened to the upper part so as to reinforce it such that when assembled, the upper part and the lower part are adapted to bear the stresses to which the cross-member may be subjected in flight conditions of the aircraft.

14 Claims, 3 Drawing Sheets

(56) References Cited

U.S. PATENT DOCUMENTS

| | | | | |
|---|---|---|---|---|
| 8,613,408 | B2* | 12/2013 | Marpinard | B64C 1/18 |
| | | | | 244/119 |
| 8,899,521 | B2* | 12/2014 | Delahaye | B64C 1/18 |
| | | | | 244/118.1 |
| 9,126,674 | B2* | 9/2015 | Krog | B64C 1/065 |
| 2009/0184199 | A1* | 7/2009 | Leisten | B64C 1/18 |
| | | | | 244/1 A |
| 2009/0294587 | A1 | 12/2009 | Ricaud et al. | |
| 2009/0321569 | A1 | 12/2009 | Schroeer et al. | |
| 2010/0127123 | A1* | 5/2010 | Hoffjann | B64D 11/02 |
| | | | | 244/118.1 |
| 2011/0001008 | A1* | 1/2011 | Delahaye | B64C 1/18 |
| | | | | 244/119 |
| 2011/0155850 | A1* | 6/2011 | Noebel | B64C 1/18 |
| | | | | 244/119 |

FOREIGN PATENT DOCUMENTS

| | | | | |
|---|---|---|---|---|
| WO | WO 2011124215 A1 * | 10/2011 | | B64C 1/18 |
| WO | WO 2012/146858 | 11/2012 | | |

OTHER PUBLICATIONS

English Translation of the International Search Report with Written Opinion for Application No. PCT/FR2012/050840 dated Jan. 24, 2014.

* cited by examiner

AIRCRAFT FUSELAGE AND METHOD FOR CONSTRUCTING A FLOOR IN SUCH A FUSELAGE

CROSS-REFERENCE TO RELATED APPLICATIONS

This application is a continuation of PCT Application Serial No. PCT/FR2012/050840, filed Apr. 17, 2012, which claims priority to French Application Serial No. FR 1101290, filed Apr. 26, 2011, the entire contents of which are both incorporated by reference herein.

TECHNICAL FIELD

The present invention concerns an aircraft fuselage and a method for forming a floor in such a fuselage.

BACKGROUND

Most aircraft have a fuselage of cylindrical general shape. The structure of the fuselage comprises substantially circular frames disposed transversely and linked to each other by longerons.

In aircraft intended for the transport of passengers, a floor needs to be formed inside the fuselage to receive the passengers. To form such a floor, a usual solution consists of disposing a cross-member inside each frame of the fuselage structure and to form a floor on the cross-members so disposed. This floor most commonly integrates longitudinal rails which are used to form the fastening for seats intended to receive the passengers as well as various members (walls, furniture, etc.) used in creating the interior layout of the aircraft.

FIG. 1 is a very diagrammatic illustration of a transverse cross-section of an aircraft fuselage. A frame 2 of circular shape can be seen here. A cross-member 4 is mounted on the frame 2 and is adapted to participate in the formation of a floor to support the load of the passengers and of the various members adapted to be located above the floor as well as to provide the separation between a cabin adapted to receive the passengers together with the cockpit, and a lower part of the aircraft forming a hold. To reinforce the structure of the floor, tie rods 6 may be provided to support a cross-member 4.

SUMMARY

The present invention more particularly concerns the structure of a cross-member 4 such as that shown very diagrammatically in FIG. 1. FIGS. 2 to 4 illustrate cross-members 4 known from the prior art, FIG. 5 illustrating the structure of a cross-member according to the present invention. The views in FIGS. 2 to 5 correspond to views at enlarged scale of detail A in FIG. 1.

A first structure for a cross-member 4 is illustrated in FIG. 2. In this solution, the longitudinal rails 8 are integrated within the height of the cross-member 4. The solution provided here makes it possible to take advantage of the entire height permitted by the volume of the floor to integrate the cross-member 4. It thus provides very good mechanical strength to the floor. Panels 10 can also be seen in FIG. 2 which extend from one cross-member 4 to the other to form the actual floor itself. To enable the integration of systems (electrical, pneumatic, hydraulic, etc.), openings 12 are formed in the cross-member 4. Although this solution enables good guidance and good support for systems 14, the putting in place of those systems 14 is an operation which is onerous and which is costly in terms of time. To be precise, certain cable harnesses weigh several hundred pounds and such harnesses need to be passed through openings 12 of successive cross-members 4.

FIG. 3 illustrates another solution in which the longitudinal rails 8 are laid on the cross-member 4. As that Figure shows, the panels 10 forming the actual floor itself rest on the longitudinal rails 8 and the systems 14 pass between the cross-member 4 and the panels 10.

The solution provided here enables facilitated integration of the systems. The electrical harnesses for example are easily unwound and simply come to rest on the cross-members.

However, in mechanical terms, the panels 10 of the floor contribute little to the stiffness of the floor assembly and reinforcing members have to be provided to obtain satisfactory mechanical performance. Relative to the structure shown in FIG. 2, it is necessary either to provide a greater volume to form the floor, or to increase the mass thereof (or of course a combination of these two variants).

The solution of FIG. 4 attempts to integrate the advantages of the solution illustrated in FIG. 2 and those of the solution of FIG. 3, by minimizing the drawbacks of these prior solutions. In this solution, the upper part of the cross-member 4 integrates the longitudinal rails 8. The panels 10 forming the actual floor itself rest on the cross-members 4 and the longitudinal rails 8 as in the embodiment shown in FIG. 2. Again present here are openings 12 for the passage of systems 14. However, these openings are reserved for integrating the easiest systems to install. These openings 12 for example receive water lines or cables of small diameters. The harnesses which are heavier and more difficult to install are housed in cut-outs 16 formed in the lower part of the cross-member 4.

This solution thus partially solves the problem of the onerousness of installing certain systems. It should be noted for example that the capacity for systems for the solution provided in FIG. 4 is less than that for the solution provided in FIG. 3. In mechanical terms, as regards the stiffness obtained, this is a little less than that of the structure given by FIG. 2.

An aircraft floor is also known from document FR 2947525 comprising a central part capable of being assembled externally of the fuselage then mounted therein after assembly. The cross-members of the central part of the floor each comprise an upper part and a lower part, a space being provided between the two parts for the passage of systems such as pipes for fluids, electrical harnesses or similar. Once the systems have been put in place between the two parts of the cross-members each cross-member upper part is joined to its lower part, the floor central part is completed by floor panels, then that central part is mounted in the fuselage. To that end, each cross-member is hingedly mounted at its ends on the end of a section of cross-member or clip fastened to the fuselage and supported by a tie rod in the neighborhood of the hinge.

Among other things, the present invention is directed to providing a fuselage structure which gives good mechanical performance and enables easy integration of a high number of systems without requiring assembly outside the fuselage of part of the floor and systems.

To that end, the invention relates to an aircraft fuselage comprising cross-members adapted for the formation of a floor, at least one of said cross-members comprising an upper part, a lower part, means for linking the lower part to the upper part, and at least one opening for the passage of systems which is delimited between the lower part and the upper part, said fuselage being remarkable in that the upper part of said cross-member is fastened to the fuselage and is dimensioned so as to bear the stresses to which said cross-member may be subjected when the aircraft remains on the ground, and in that the lower part of said cross-member is fastened to the upper part thereof so as to reinforce it such that when assembled, the upper part and the lower part are adapted to bear the stresses to which said cross-member may be subjected in flight conditions of the aircraft. Thanks to such a fuselage with cross-members in two parts, the mounting of systems inside the fuselage between the two cross-member parts is greatly facilitated, while the fuselage provides good mechanical performance both during and after that operation.

According to a possible feature of the invention, the upper part and the lower part of said cross-member comprise linking lugs, and the linking lugs of the lower part are disposed so as to face the linking lugs of the upper part. This embodiment enables a large space to be reserved for housing systems.

To ensure a good link between the upper part and the lower part, and in this way provide good mechanical characteristics, the upper part and the lower part each have for example bores disposed so as to be able to coincide with each other, and the linking means advantageously comprise a conical nut and bolt.

According to a preferred embodiment which enables a simple and robust link to be provided between the two cross-member parts, the upper part has pairs of linking lugs forming clevises, a linking lug of the lower part being able to come into place between the two linking lugs of the upper part, or vice-versa.

According to a possible feature of the invention, between said linking lugs openings are formed in which the various systems may be located, said openings being delimited above by said upper part and below by said lower part.

According to another possible feature of the invention, the upper part of said cross-member is a member of I-shaped cross-section and the lower part of said cross-member has a base plate and a rib. These profiles of the upper and lower parts of the cross-member enable good mechanical performance of the fuselage to be ensured both during manufacturing and during use of the aircraft.

According to another possible feature of the invention, said member of I-shaped cross-section comprises a lower flange bearing said clevises and said rib bears said linking lugs of the lower part. This means that the openings for passing systems are provided between the lower flange of the member of I-shaped cross-section and the lower part of the cross-member, and that consequently the member of I-shaped cross-section lacks openings capable of affecting its mechanical characteristics.

According to another possible feature of the invention, the cross-member has an upper part produced from a different material to that used to produce its lower part, which may, for example, enable weight savings to be made.

Thus, for example, in the case of an aircraft having a structure of composite material, a cross-member may have an upper part produced from a composite material, in particular a composite material integrating carbon fibers, and a lower part produced from an electrically conducting material, such as a metal or a metal alloy. The metal part may then serve to provide a return for current in the aircraft.

According to another possible feature of the invention, the floor comprises a set of cross-members in accordance with said above cross-member in two parts and which are disposed parallel to each other, the upper parts of the cross-members being linked together by rails designated longitudinal rails, and at least one longitudinal rail having cut-outs within each of which a cross-member comes to be accommodated. In such a floor, the longitudinal rails, for example rails adapted for the fastening of aircraft seats, are thus integrated at least partially within the height of the upper part of the cross-members.

The present invention also relates to an aircraft comprising a fuselage as defined above.

Lastly, the present invention also relates to a method of producing a floor in an aircraft fuselage, said floor comprising cross-members forming a load-bearing structure adapted to receive floor panels and to bear systems, at least one of said cross-members being produced in two distinct parts comprising an upper part and a lower part delimiting between them at least one opening for the passage of systems, said method being remarkable in that:

in a first step only the cross-member upper part is fastened onto the fuselage.
in a second step said systems are put into place under said cross-member upper part, and
in a third step said cross-member lower part is joined to said upper part.

By virtue of this method, the mounting of the systems may be carried out directly within the fuselage of the aircraft while being much easier than when the cross-members are a single part.

BRIEF DESCRIPTION OF THE DRAWINGS

Details and advantages of the present invention will emerge more clearly from the following description, which is given with reference to the accompanying diagrammatic drawings in which.

DETAILED DESCRIPTION

Figure 1:
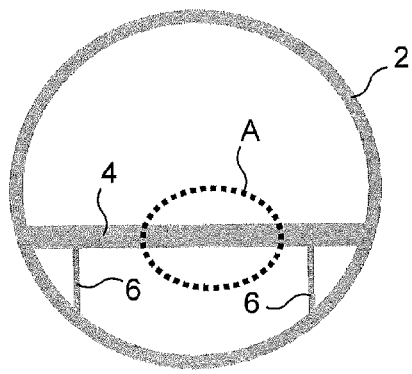
FIG. 1 is a diagrammatic transverse cross-section view of an aircraft fuselage.
Figure 2:
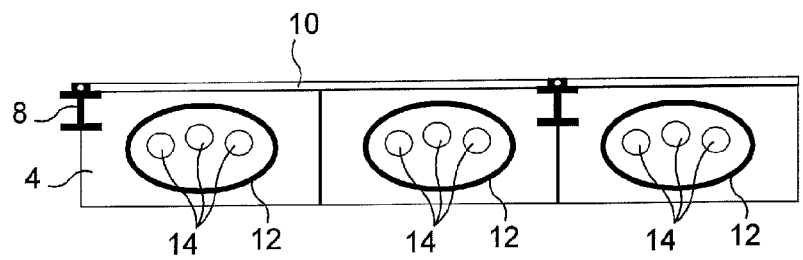
FIGS. 2 to 4 are detail views of region A of FIG. 1, these Figures having already been described in the introduction of the present application.
Figure 3:
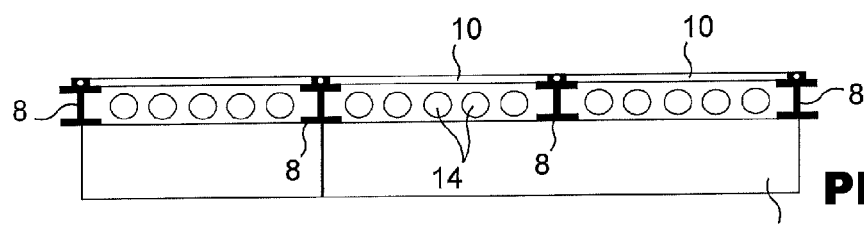
Figure 4:
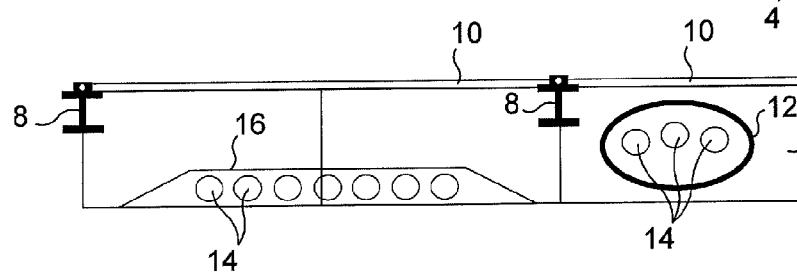
Figure 5:
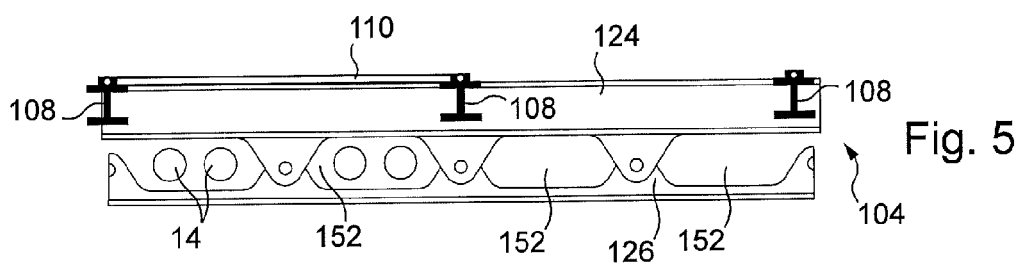
FIG. 5 is a view corresponding to the views of FIGS. 2 to 4 illustrating a solution according to the present invention.

FIGS. 1 to 4 have been described in the introduction of the present document. As mentioned in that introduction, FIG. 5 is a detail view at enlarged scale of region A of FIG. 1. This FIG. 5 illustrates the structure of an aircraft floor according to the present invention. This floor comprises cross-members 104 according to the present invention, longitudinal rails 108 as well as floor panels 110.

The longitudinal rails 108 will not be described in detail here. These rails, which are in a floor according to the present invention, may have a conventional form of longitudinal rails usually used in the structure of an aircraft floor and adapted to receive for example the seats of an aircraft cabin. In the embodiment represented here, the longitudinal rails 108 have the form of a rail of I-shaped cross-section which furthermore comprises a groove used in particular for fastening seats or other members onto the corresponding floor.

The panels 110 that form the actual floor itself are not described either. They may here be of any type of panel or plate of the prior art compatible with the structure of the floor according to the present invention.

In an entirely original way, the cross-member 104 is formed in two parts, the upper part 124 and a lower part 126.

Figure 9:
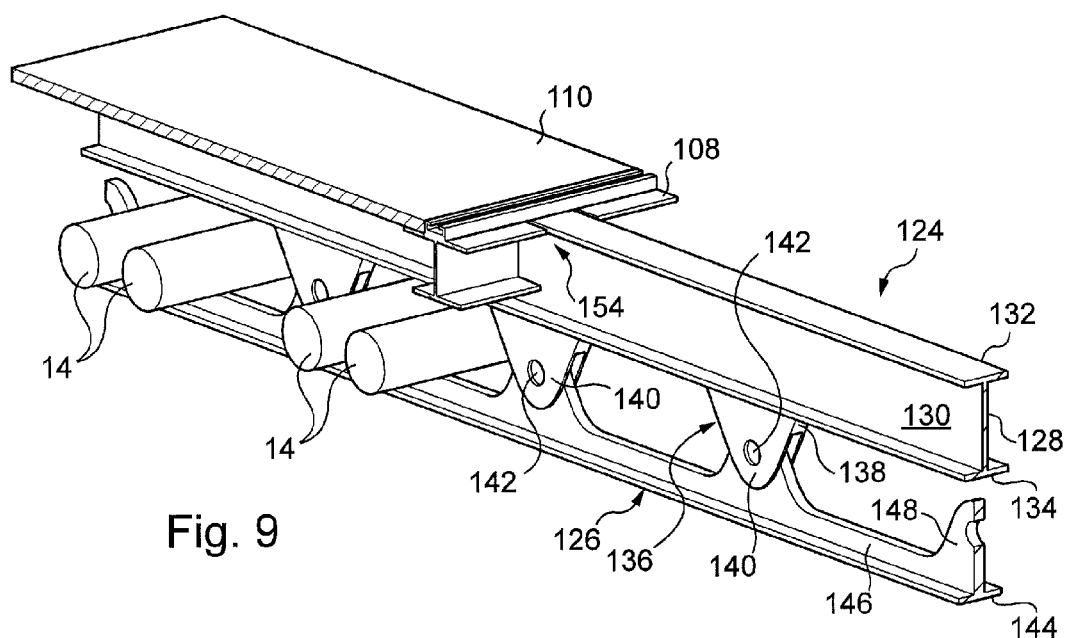
FIG. 9 is a perspective view of the assembly shown in FIG. 8.

As can be seen in particular in FIG. 9, the upper part 124 comprises a member 128 of I-shaped profiled cross-section.

It is assumed throughout the description that the a member 128 of profiled cross-section extends horizontally. The orientations up/down make reference in the present description to a "normal" orientation of an aircraft. Thus, the groove of the longitudinal rails 108 is placed in upward position and the cross-member 104 is situated below the panels 110.

The member 128 of profiled cross-section thus has a substantially flat web 130 extending in a vertical plane This web 130 bears an upper flange 132 and a lower flange 134. As regards the upper flange 132 and the lower flange 134, these extend in horizontal planes.

The lower face of the lower flange 134 bears clevises 136. Each clevis comprises a base 138 from which extend two linking lugs 140. Each of these linking lugs 140 is of substantially flat shape with a contour of triangular general shape, the corners of the triangle being rounded. The clevis 136 is centered relative to the member 128 of profiled cross-section such that the linking lugs 140 extend vertically and parallel to the web 130. Each linking lug 140 comprises a bore 142. The bore of a linking lug 140 of a clevis 136 is aligned with the bore 142 of the other linking lug 140 of the same clevis 136.

The lower part 126 comprises a base plate 144 which may for example be similar to the lower flange 134 of the member 128 of profiled cross-section. In mounted position of the lower part 126, the base plate 144 extends parallel to the upper flange 132 and to the lower flange 134 of the member 128 of profiled cross-section.

The base plate 144 bears a rib 146 at its center which extends vertically towards the upper part 124 (still in the mounted position of the cross-member 104).

The rib 146 bears linking lugs 148. Each linking lug 148 presents for example the same shape as a linking lug 140. The linking lugs 148 extend in a vertical plane (in mounted position of the cross-member 104) and are adapted each time to position between two linking lugs 140 of the upper part 124. In each linking lug 148 there is to be found a bore 142 which has the same characteristics (in particular diameter) as the bores 142 of the linking lugs 140. In the preferred embodiment represented in the drawings, the two linking lugs 140 of the same clevis 136 are of the same thickness whereas the linking lug 148 is of greater thickness.

Figure 11:
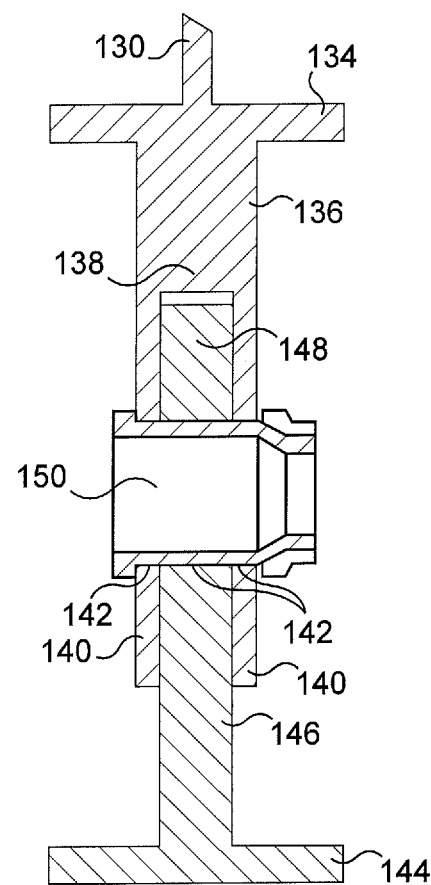
FIG. 11 is a cross-section view on line X-X of FIG. 8, at enlarged scale, illustrating the link between a lower part and an upper part of a cross-member according to the present invention.

FIG. 11 illustrates the assembly of the lower part 126 to the upper part 124. Use of a conical nut and bolt 150 is provided for. For example, a large diameter light-weight nut and bolt is chosen. The bolt of this nut and bolt is thus tubular, as shown in FIG. 11. The use of a conical nut and bolt makes is possible to take up the play between the linking lugs 140 of the upper part and the linking lugs 124 of the lower part 148. The use of such nuts and bolts thus enables proper positioning of the lower part 126 relative to the upper part 124. To perform the assembly, the linking lugs 148 are each disposed each time between two linking lugs 140 of the upper part 124 such that the three corresponding bores are aligned. The bolt of the conical nut and bolt 150 may then be inserted into the three aligned bores 142 and the nut of the nut and bolt is then mounted on the end of the bolt.

As can be seen in the drawings and as shown by the preceding description, the linking lugs 140, 148 of both the upper part 124 and of the lower part 126 project and thus constitute formations like teeth, which may be regularly or irregularly spaced, and which all extend from a member of profiled cross-section. When the corresponding parts have been assembled, spaces forming openings 152 appear between the teeth, which are here the linking lugs 140, 148. The periphery of these openings 152 is delimited above by the upper part 124 of the cross-member 104 and below by the lower part 126 of the cross-member 104.

Figure 6:
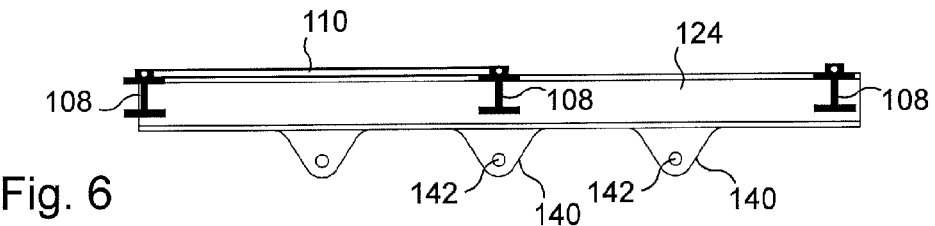
FIG. 6 illustrates a side view of an upper part of a cross-member according to the present invention.
Figure 7:
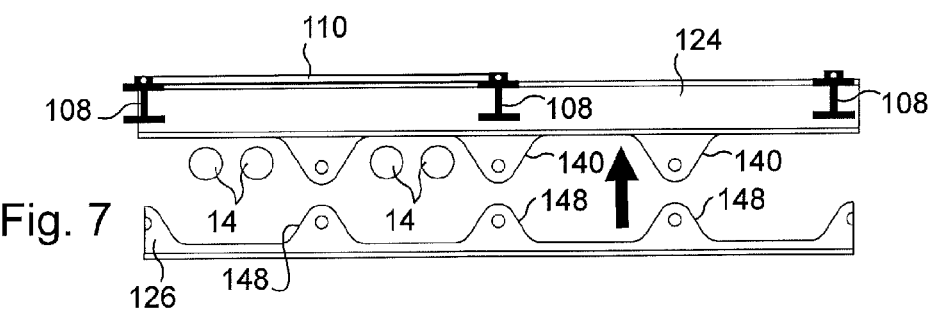
FIG. 7 is a similar view to FIG. 6 also illustrating a side view of a lower part of a cross-member according to the present invention.
Figure 8:
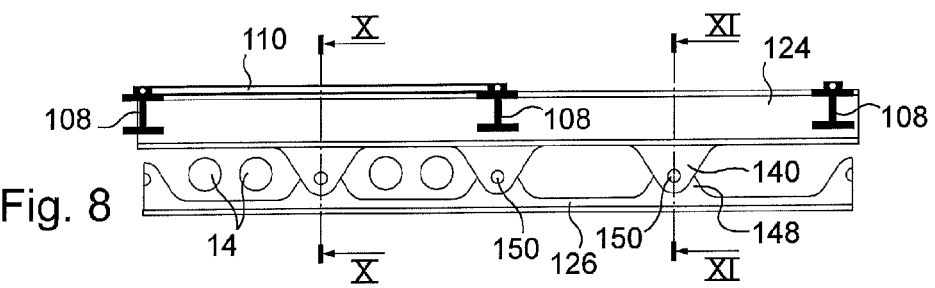
FIG. 8 is a side view illustrating a cross-member according to the present invention in operational phase.

The openings 152 are exploited to enable the passage of systems 14. The putting in place of those systems is illustrated in FIGS. 6 to 8. On assembly of an aircraft, the upper part 124 of a cross-member 104 is put in place in the same way that a cross-member 4 of the prior art was mounted in an aircraft. This upper part 124 already has sufficient mechanical characteristics to withstand the usual constraints encountered by an aircraft. The mounting of this upper part 124 thus gives the structure of the aircraft sufficient stiffness for all the mounting steps during the manufacture of the aircraft. The various systems 14 may be positioned between the clevises 136 of the upper part 124. Of course, it may be possible to adapt the position of the clevises to the systems that are to be positioned under the floor. Once the systems 14 have been positioned, the lower part 126 is mounted as illustrated in FIG. 7. When the lower part 126 is positioned, it is assembled, for example using conical nuts and bolts 150 as illustrated in FIG. 11, and the complete cross-member 104 as shown in FIGS. 8 and 9 is obtained. The lower part 126 of the cross-member 104 gives it increased strength, relative to the upper part 124 alone, which is sufficient to withstand high loads such as those encountered during accidents (crashes, depressurizations, etc.).

It may be provided to use different materials to produce the upper part 124 and the lower part 126. The two parts may be produced from metal alloys. It may also be provided to form the upper part 124 for example from a composite material based on carbon fibers (or something else). By producing one of the two parts, the upper part 124 or lower part 126, from a metal alloy, it is possible to make the cross-member 104 contribute to the "current return" function. This function is provided in aircraft having a metal structure by the whole structure of the aircraft. However, in aircraft with a composite structure, it is necessary to provide a return for current in the electrical circuit of the aircraft.

The form of a cross-member according to the present invention may be adapted to different forms of fuselage and to the different stresses defined by the specifications for the construction of the aircraft. FIGS. 5 to 10 illustrate the integration of such cross-members to produce a floor. Thus longitudinal rails 108 are present which may be entirely similar to longitudinal rails of the prior art. Here there are longitudinal rails 108 taking the form of a member of profiled cross-section of I-shaped cross-section on which a groove is provided serving in particular for fastening members, for example such as aircraft seats. Such a longitudinal rail is known to the person skilled in the art and is not described in detail here. To form a floor, provision is made to form a cut-out in the longitudinal rails 108 at the location of the cross-members 104. Thus each time housings 154 are formed in the longitudinal rails to receive the corresponding cross-member 104.

Figure 10:
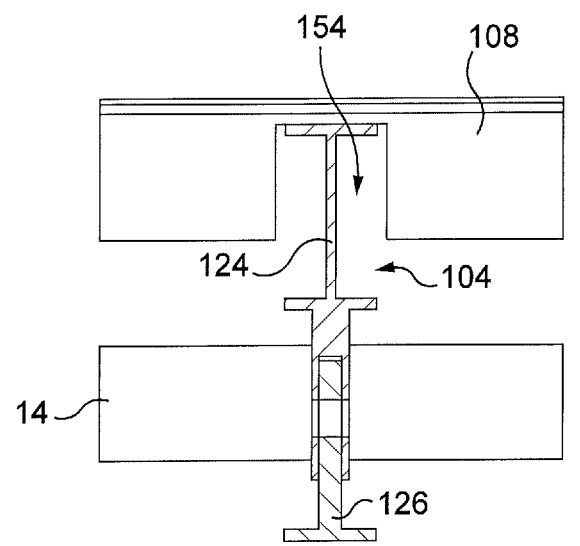
FIG. 10 is a cross-section view on section line X-X of FIG. 8.

Once the cross-members 104 and the longitudinal rails 108 have been put in place, panels 110 may be put in place to form the actual floor itself. FIG. 10 is a cross-section view illustrating the mounting of a longitudinal rail 108 on a cross-member 104.

As the preceding description shows, a cross-member according to the present invention enables integration thereof in two phases. A first phase enables the integration of systems while giving sufficient mechanical strength for all the mounting operations. During the second phase, the cross-member is reinforced in order to be able to withstand the high loads to which it may be subjected and finalizes the support for the systems.

The solution provided not only makes it possible to provide a useful volume to accommodate the systems but is also optimized to provide sufficient stiffness in a limited space. Thus, the solution provided has both the advantage of mechanical strength of the prior art solution illustrated in FIG. 2 and the advantage of facilitating the integration of systems of the prior art solution illustrated in FIG. 3.

Of course, the present invention is not limited to the preferred embodiment described above and illustrated in the drawings, nor to the variants referred to. It also concerns all the other variant embodiments within the capability of the person skilled in the art in the context of the following claims.

The invention claimed is:

1. A fuselage of an aircraft comprising cross-members configured for use in formation of a floor, a plurality of the cross-members each respectively comprising:
   an upper part fastened to the fuselage, wherein the upper part is dimensioned so as to bear stresses to which the plurality of the cross-members may be subjected when the aircraft is not in flight;
   a lower part directly fastened only to the upper part as a reinforcement such that, when assembled, the upper part and the lower part bear stresses to which the plurality of the cross-members may be subjected when the aircraft is in flight;
   at least one linkage for linking the lower part to the upper part; and
   an opening for a passage of systems, the opening being located between the lower part and the upper part,
   wherein the lower part is configured to be unfastened from the upper part without the upper part being unfastened from the fuselage, so that the systems passing through the opening between the lower part and the upper part are removable while the upper part is fastened to the fuselage.

2. The fuselage according to claim 1, wherein the upper and lower parts each respectively comprise one or more linking lugs, the one or more linking lugs of the lower part being disposed, in an assembled state, to face the one or more linking lugs of the upper part.

3. The fuselage according to claim 1, wherein the upper and lower parts each respectively comprise one or more bores, wherein the one or more bores of the upper part are disposed, in an assembled state, to coincide with the one or more bores of the lower part, and wherein the at least one linkage comprises a conical nut and bolt.

4. The fuselage according to claim 1, wherein the upper part comprises at least one pair of linking lugs forming clevises and the lower part comprises at least one linking lug, which is located, in an assembled state, between a corresponding pair of the at least one pair of linking lugs of the upper part.

5. The fuselage according to claim 2, wherein the one or more linking lugs of the upper and lower parts each, respectively, comprise two or more linking lugs, the opening being defined by a space between the two or more linking lugs of the upper and lower parts, respectively.

6. The fuselage according to claim 1, wherein the upper part is a member of I-shaped cross-section when viewed along a length thereof, and wherein the lower part comprises a base plate and a rib.

7. The fuselage according to claim 4, wherein the upper part comprises an I-shaped cross-section with respect to a length thereof, a lower flange of the I-shaped cross-section bearing the clevises, and wherein the lower part comprises a base plate and a rib, the rib bearing the at least one linking lug of the lower part.

8. The fuselage according to claim 1, wherein the upper part comprises a different material than the lower part.

9. The fuselage according to claim 7, wherein the upper part comprises a composite material and the lower part comprises an electrically conducting material.

10. The fuselage according to claim 1, wherein:
   the cross-members of the plurality of the cross-members are oriented parallel to each other,
   the upper parts of each cross-member of the plurality of the cross-members are linked to respectively adjacent cross-members of the plurality of the cross-members by longitudinal rails, and
   at least one of the longitudinal rails comprises at least one cut-out, within which at least one cross-member of the plurality of the cross-members is located.

11. An aircraft comprising a fuselage according to claim 1.

12. The fuselage according to claim 1, wherein the lower part comprises pairs of linking lugs in a form of clevises, a linking lug of the upper part being located between the pair of linking lugs of the lower part when assembled.

13. The fuselage according to claim 1, wherein the upper part and the lower part each respectively comprise pairs of linking lugs in a form of clevises, the pair of linking lugs of the upper part being located between the pair of linking lugs of the lower part when assembled.

14. A method of producing a floor in a fuselage of an aircraft, the fuselage comprising cross-members configured for use in formation of the floor, a plurality of the cross-members each respectively comprising:
   an upper part fastened to the fuselage, wherein the upper part is dimensioned so as to bear stresses to which the plurality of the cross-members may be subjected when the aircraft is not in flight;
   a lower part directly fastened only to the upper part as a reinforcement such that, when assembled, the upper part and the lower part bear stresses to which the plurality of the cross-members may be subjected when the aircraft is in flight;
   at least one linkage for linking the lower part to the upper part; and
   an opening for a passage of systems, the opening being located between the lower part and the upper part,
   wherein the lower part is configured to be unfastened from the upper part without the upper part being unfastened from the fuselage, so that the systems passing through the opening between the lower part and the upper part are removable while the upper part is fastened to the fuselage;

the method comprising:

providing the plurality of the cross-members forming a load-bearing structure adapted to receive floor panels and to bear the systems, the plurality of the cross-members being produced in two distinct parts comprising the upper part and the lower part, delimiting therebetween the opening for the passage of the systems;

fastening the upper part onto the fuselage;

installing the systems in the opening between the lower part and the upper part; and joining the lower part to only the upper part in a removable manner, so that the systems passing through the opening between the lower part and the upper part are removable.

* * * * *